May 9, 1967   K. L. TREIBER   3,318,336
HIGH PRESSURE BELLOWS
Filed Oct. 7, 1964
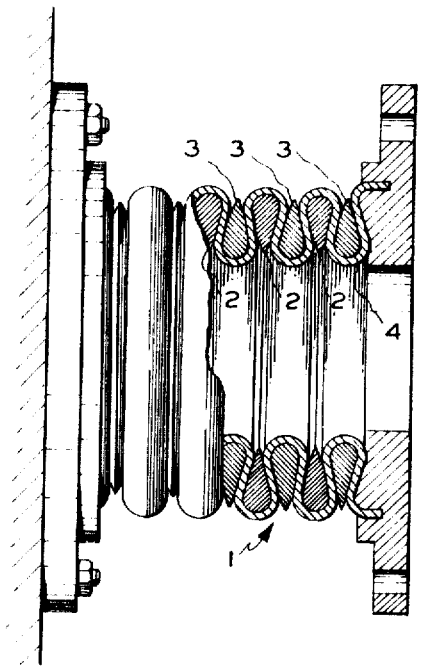
INVENTOR
KENNETH L. TREIBER

United States Patent Office 3,318,336
Patented May 9, 1967

3,318,336
HIGH PRESSURE BELLOWS
Kenneth L. Treiber, 402 Villamay Blvd.,
Alexandria, Va. 22307
Filed Oct. 7, 1964, Ser. No. 402,366
2 Claims. (Cl. 138—121)

ABSTRACT OF THE DISCLOSURE

This invention is directed to a bellows structure that will withstand high pressures at high temperatures. The bellows has supplied therefor two sets of rings of tear drop cross sectional shape which combine to provide a substantially rigid support means for the bellows during changes in the length of the bellows.

---

The invention herein described may be manufactured and used by the Government of the United States of America for governmental purposes without payment to me of any royalties thereon.

The present invention relates to high pressure expansion type bellows for fluids and, more particularly, to bellows having reinforcing, supporting inner and outer members.

Reinforced bellows in the prior art typically constitute a weak spot or link in a fluid transfer or confining system because such bellows or expansion joint was inherently susceptible to failure permitting leakage. This is due to the necessity of using thin, flexible material or relatively low strength when compared to the solid, usually metal, or semi-rigid material, used in the rest of the system.

The present invention overcomes the weakness aforementioned by the use of internal and external supporting rings of tear drop configuration in cross-section. The tear drop configuration is a necessary characteristic that contributes to the efficacy of this invention. As is well known, the tear drop has an arcuate section terminating in a pair of substantially flat sides which converge into an apex. The substantially flat sides support the side surface of the bellows convolutions and abut the convolutions in the compressed position and constitute a solid conduit or sleeve composed of the bellows lying between and contiguous with the tear drop shaped rings as a unit. The reinforcing, supporting rings furnish total support for the bellows when the bellows is in its compressed condition as shown in the figure. When the bellows is expanded axially beyond the position shown in the figure, the rings are no longer totally contiguous with the bellows convolutions. However, the bellows is still supported radially so that the cylindrical configuration of the bellows is preserved and relatively high pressure applied to the bellows is withstood. These pressures can be in the range of ten or more times those applied to unsupported bellows and the tear drop shapes provide for magnitudes of increase of dependability over prior support configurations. The natural curved shape of the bellows is maintained with continuous support on the curved sections thereof and without any corners in the support means to weaken the bellows. The material of the bellows that is between the adjacent rings is shaped like the frustrum of a cone having a very wide angle at its apex. The extension of the bellows causes this frustrum to change through a planar ring shape to a frustrum of a cone of opposite shape. That is, the apex of the cone passes from one side of said frustrum through the central portion of said frustrum to the other side of the frustrum. Because of the action of the support rings, the bellows material is maintained in substantially constant support during changes in bellows length.

It is, therefore, an object of this invention to provide a rigid-to-flexible bellows which is capable of withstanding either internally or externally applied pressures in all positions.

Another object of this invention is to provide a bellows which is a solid sleeve in its unextended position.

Still another object of this invention is to provide a bellows which in its expanded position has a strength dependent upon the strength of the bellows material as supported radially by the internal and/or external supporting rings.

A further object of this invention is to provide a bellows of superior strength whether pressure is applied internally or externally thereof.

The exact nature of this invention as well as other objects and advantages thereof will be readily apparent from consideration of the following specification relating to the annexed drawing in which:

The figure is a pictorial-sectional drawing of an embodiment of the invention.

The figure shows an expansible collapsible bellows 1 which is capable of a very large amount of expansion without damage. This is accomplished by the inclusion of rings 2 and 3 of tear drop cross-section between successive inner and outer convolutions of the bellows. The rings alternate in having the apices thereof directed toward the axis of the bellows for the rings 2 which are inside the convolutions. The apices of the rings 3 which are outside the convolutions are directed away from the axis of the bellows. This results in the material 4 of the bellows 1 being snugly supported internally by rings 2 and externally by rings 3. The natural curved shape of the bellows is maintained without any discontinuous support and without any corners. When the bellows is contracted to its minimum position, the bellows becomes a solid, strengthened sleeve. When the bellows is extended, the expansion is considerably greater than prior supported bellows were capable of achieving.

These features enable this bellows to be used for precision rotating mechanical seals such as are needed in compressors, pumps and other similar equipment. Bellows per se require metals too thin to withstand a very high internal or external fluid pressure or too thick to properly flex. The tear drop cross-section rings 2 and 3 enable the use of metals hitherto unsuitable in dimensions appropriate for bellows use. The reinforced-supported bellows of this invention may be used as an expansion joint where high internal or external pressures are involved.

The bellows and rings of this invention can be made of bronze, steel, stainless steel, sheet steel, Monel metal or nickel alloys as well as plastics and other materials.

It should be understood, of course, that the foregoing disclosure relates to only a preferred embodment of the invention and that it is intended to cover all changes and modifications of the example of the invention herein chosen for the purposes of the disclosure, which do not constitute departures from the spirit and scope of the invention set forth in the appended claims.

What is claimed is:

1. In a bellows device, a cylindrical bellows means having convolutions in the surface thereof, first ring support means positioned in said convolutions within said bellows means and second ring support means positioned in said convolutions externally of said bellows means, said first ring support means having a first tear drop configuration in cross-section, said first tear drop configuration having an apex directed toward the central axis of said bellows means, said second ring support means having a second tear drop configuration in cross-section, said second tear drop configuration having an apex directed away from the central axis of said bellows, and said first and second ring support means having substantially the same radial dimensions.

2. In the bellows device of claim 1, said bellows means being a substantially solid supported tubular means in its unextended position and maintaining its cylindrical configuration in its extended position.

References Cited by the Examiner

UNITED STATES PATENTS

| | | | |
|---|---|---|---|
| 1,311,025 | 7/1919 | Sundh | 138—135 X |
| 2,893,431 | 7/1959 | Bowditch | 138—121 X |
| 2,963,043 | 12/1960 | Davis et al. | 92—42 |

LAVERNE D. GEIGER, *Primary Examiner.*

C. L. HOUCK, *Assistant Examiner.*